United States Patent
Sheth et al.

(10) Patent No.: US 10,129,274 B2
(45) Date of Patent: Nov. 13, 2018

(54) IDENTIFYING SIGNIFICANT ANOMALOUS SEGMENTS OF A METRICS DATASET

(71) Applicant: Adobe Systems Incorporated, San Jose, CA (US)

(72) Inventors: Suraj Satishkumar Sheth, Karnataka (IN); Shagun Sodhani, Delhi (IN); Rohit Bajaj, Uttar Pradesh (IN); Nitin Goel, Uttar Pradesh (IN); Manoj Awasthi, Jakarta Selatan (ID); Kapil Malik, Haryana (IN); Harsh Rathi, Haryana (IN); Balaji Krishnamurthy, Uttar Pradesh (IN)

(73) Assignee: Adobe Systems Incorporated, San Jose, CA (US)

( * ) Notice: Subject to any disclaimer, the term of this patent is extended or adjusted under 35 U.S.C. 154(b) by 141 days.

(21) Appl. No.: 15/273,213

(22) Filed: Sep. 22, 2016

(65) Prior Publication Data
US 2018/0083995 A1    Mar. 22, 2018

(51) Int. Cl.
  *H04L 29/06* (2006.01)
  *G06F 17/30* (2006.01)
  *H04L 12/26* (2006.01)

(52) U.S. Cl.
  CPC ...... *H04L 63/1416* (2013.01); *G06F 17/3089* (2013.01); *G06F 17/30958* (2013.01); *H04L 43/00* (2013.01)

(58) Field of Classification Search
  CPC .......... H04L 63/1425; H04L 63/1416; G06F 17/30958
  See application file for complete search history.

(56) References Cited

U.S. PATENT DOCUMENTS 8,762,298 B1 *  6/2014  Ranjan ............... G06N 5/02
                                              706/12
9,276,948 B2 *  3/2016  Hitt ................... H04L 63/1425
(Continued)

OTHER PUBLICATIONS

Adobe Systems Incorporated, "Quickstart for Contribution Analysis", http://marketing.adobe.com/resources/help/en_US/analytics/contribution/ca_workflow.html, accessed Aug. 22, 2016, 11 pages.
(Continued)

*Primary Examiner* — James R Turchen
(74) *Attorney, Agent, or Firm* — Kilpatrick Townsend & Stockton LLP

(57) ABSTRACT

In some embodiments, a processor accesses a metrics dataset, which includes metrics whose values indicate data network activity. The metrics dataset has segments. Each segment is a respective subset of the data items having a common feature. The processor identifies anomalous segments in the metrics dataset. Each anomalous segment has a segment trend that is different from a trend associated with the larger metrics dataset. The processor generates a data graph that includes nodes, which represent anomalous segments, and edges connecting the nodes. The processor applies weights to the edges. Each weight indicates (i) a similarity between a pair of anomalous segments represented by the nodes connected by the weighted edge and (ii) a relationship between the anomalous segments and the metrics dataset. The processor ranks the anomalous segments based on the applied weights and selects one or more segments with sufficiently high ranks.

17 Claims, 7 Drawing Sheets

(56) References Cited

U.S. PATENT DOCUMENTS

| | | | | |
|---|---|---|---|---|
| 2011/0035094 | A1* | 2/2011 | Van Den Berg ... | G05B 23/0251 701/31.4 |
| 2014/0068769 | A1* | 3/2014 | Neil ................... | H04L 63/1433 726/23 |
| 2015/0033086 | A1* | 1/2015 | Sasturkar ............ | G06F 11/0709 714/57 |
| 2016/0148103 | A1* | 5/2016 | Sarrafzadeh ......... | G06N 99/005 706/46 |
| 2016/0210556 | A1* | 7/2016 | Ben Simhon ........... | G06F 11/07 |
| 2016/0210631 | A1* | 7/2016 | Ramasubramanian ...................... G06Q 20/4016 | |
| 2017/0093900 | A1* | 3/2017 | Nomura .............. | H04L 63/1425 |
| 2017/0163668 | A1* | 6/2017 | Neil ................... | H04L 63/1416 |
| 2017/0230229 | A1* | 8/2017 | Sasturkar ............ | H04L 41/0631 |
| 2017/0279827 | A1* | 9/2017 | Savalle ............... | H04L 63/1425 |
| 2017/0330096 | A1* | 11/2017 | Das Gupta ............. | G06N 5/046 |
| 2018/0041528 | A1* | 2/2018 | Machlica ............ | H04L 63/1425 |
| 2018/0077175 | A1* | 3/2018 | DiValentin .......... | H04L 63/1416 |

OTHER PUBLICATIONS

Page, Lawrence, et al., The PageRank Citation Ranking: Bringing Order to the Web, Stanford University InfoLab Publication Server, Jan. 29, 1998, 17 pages.

Wikipedia, the free encyclopedia, "Pearson Product—Moment Correlation Coefficient", https://en.wikipedia.org/wiki/Pearson_product-moment_correlation_coefficient, accessed Aug. 22, 2016, 18 pages.

Megler, Veronika, "Anomaly Detection Using PySpark, Hive, and Hue on Amazon EMR", AWS Big Data Blog, http://blogs.aws.amazon.com/bigdata/post/tx2642DKK75JBP8/Anomaly-Detection-Using-PySpark-Hive-and-Hue-on-Amazon-EMR, Mar. 24, 2016. 8 pages.

Bloomberg, Jason, "Real-Time Anomaly Detection and Analytics for Today's Digital Business", Intellyx White Paper, Intellyx LLC, 2016, 4 pages.

Git-Hub, Inc., "Anomaly Detection: Anomaly Detection With R", http://github.com/twitter/anomalydetection, accessed Aug. 22, 2016, 3 pages.

Adobe Systems Incorporated, "Anomaly Detection", http://marketing.adobe.com/resources/help/en_US/reference/anomaly_html, accessed Aug. 22, 2016, 2 pages.

Kissmetrics Blog, "7 Essential Intelligence Events for Your Google Analytics Account", Blog About Analytics, Marketing and Testing, https://blog.kissmetrics.com/7-essential-intelligence-events, accessed Aug. 22, 2016, 9 pages.

Google, "About Intelligence Events", https://support.google.com/analytics/answer/1320491?hl=en, accessed Aug. 22, 2016, 3 pages.

* cited by examiner

1

IDENTIFYING SIGNIFICANT ANOMALOUS SEGMENTS OF A METRICS DATASET

TECHNICAL FIELD

This disclosure relates generally to computer-implemented methods and systems for anomaly detection in data gathered via data networks, and more particularly relates to enabling processing devices to identify significant anomalous segments of a metrics dataset.

BACKGROUND

When online services are used via networked computing environments, interactions with the online services generate large amounts of data that indicate various characteristics regarding the use of these online services. For example, various electronic interactions via online services (e.g., page views, website visits, webpage reloads) automatically generate data describing these actions (e.g., numbers of page views or website visits for each day of a given time period). Analysis of this data can identify issues that impact the ability of the online service to provide end-user experiences of sufficiently quality, reliability, or both.

One example of analysis that may be performed on datasets generated by online services is anomaly detection. An example of an anomaly is an outlier or group of outliers in a dataset that has a statistically significant deviation from a majority distribution. Anomaly detection involves finding trends in data that do not conform to expected or normal trends. Anomaly detection may be performed on machine-generated event log data (e.g., network logs) to detect, for example, changes in effectiveness for a given online service (e.g., network disruptions), responsiveness of end users to certain online content, indications of malware or other suspicious activity, or any other metric indicating a performance level associated with an online service.

Anomaly detection typically involves analyzing large amounts of data for possible anomalies. The amount of data required for detecting anomalies prevents (or makes impractical) reliance on human monitoring of data, and therefore requires executing automated algorithms to perform at least some of the data processing required for anomaly detection. For example, metrics data collected over a period of time may be analyzed using a time-series anomaly detection algorithm using certain metrics, dimensions, and filters.

One example of an anomaly-detection algorithm involves identifying point anomalies, where an individual value or a set of values for an individual point in time is determined to be anomalous with respect to the rest of the metrics dataset. If the value or set of values (at any point in time) differs significantly from a predicted value, then the corresponding point in time within the metrics dataset is marked as anomalous. Another example of an anomaly-detection algorithm involves identifying contextual anomalies, where certain combinations of trends in a metrics dataset deviate from an expected combination of trends. For example, if a first metric (e.g., "website visits") and a second metric (e.g., "impressions") are expected to be highly correlated over a certain time period, but exhibit a low correlation, then one of the metrics is determined to be behaving anomalously with respect to the second metric.

Current solutions for performing anomaly detection in datasets may present disadvantages. In particular, both point anomalies and contextual anomalies are determined with respect to an entire metrics dataset. For example, if a metric is "website visits," website visits resulting from any source (e.g., clicking links on search results) may be analyzed to identify a point anomaly or contextual anomaly. When considered as a whole, the metrics dataset may not exhibit anomalies. For example, if a first segment of the metrics dataset (e.g., website visits originating from a first search engine) exhibits an anomalously large number of website visits and a second segment of the metrics dataset (e.g., website visits originating from a first search engine) exhibits an anomalously small number of website visits, the large number of visits may offset the small number of visits when all data is aggregated together. Thus, an anomaly-detection algorithm may not identify any anomaly even if two anomalies are present in the dataset.

SUMMARY

Certain embodiments involve identifying significant anomalous segments of a metrics dataset. In one example, a processing device accesses a metrics dataset that includes metrics whose values indicate data network activity. The metrics dataset has segments, where each segment is a subset of data items from the metrics dataset having a common feature (e.g., hardware or software attributes of computing devices involved in the data network activity, demographic attributes of users of the computing devices, locations of the users or computing devices, etc.). The processing device identifies anomalous segments in the metrics dataset by detecting, in the anomalous segment, a trend that is uncorrelated with or otherwise deviates from a trend associated with the larger metrics dataset. For example, if the number of website visits increases over a time period for the entire metrics dataset, but the number of website visits decreases over the same time period for a particular segment of the metrics dataset, then that segment may be identified as anomalous.

Continuing with this example, the processing device ranks the identified anomalous segments. To perform this ranking, the processing device generates a data graph that includes nodes, which represent anomalous segments, and edges connecting the nodes. The processing device applies weights to the edges. Each weight indicates (i) a similarity between a pair of anomalous segments represented by the nodes connected by the weighted edge and (ii) a relationship between the metrics dataset and one or more anomalous segments in the pair. The processing device ranks the anomalous segments based on the applied weights (e.g., using a PageRank-based algorithm) and selects one or more segments with sufficiently high ranks. Thus, certain embodiments provide improvements to machine-learning systems that perform automated anomaly-detection methods by analyzing large data sets on a segment-by-segment basis rather than as an aggregated whole.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
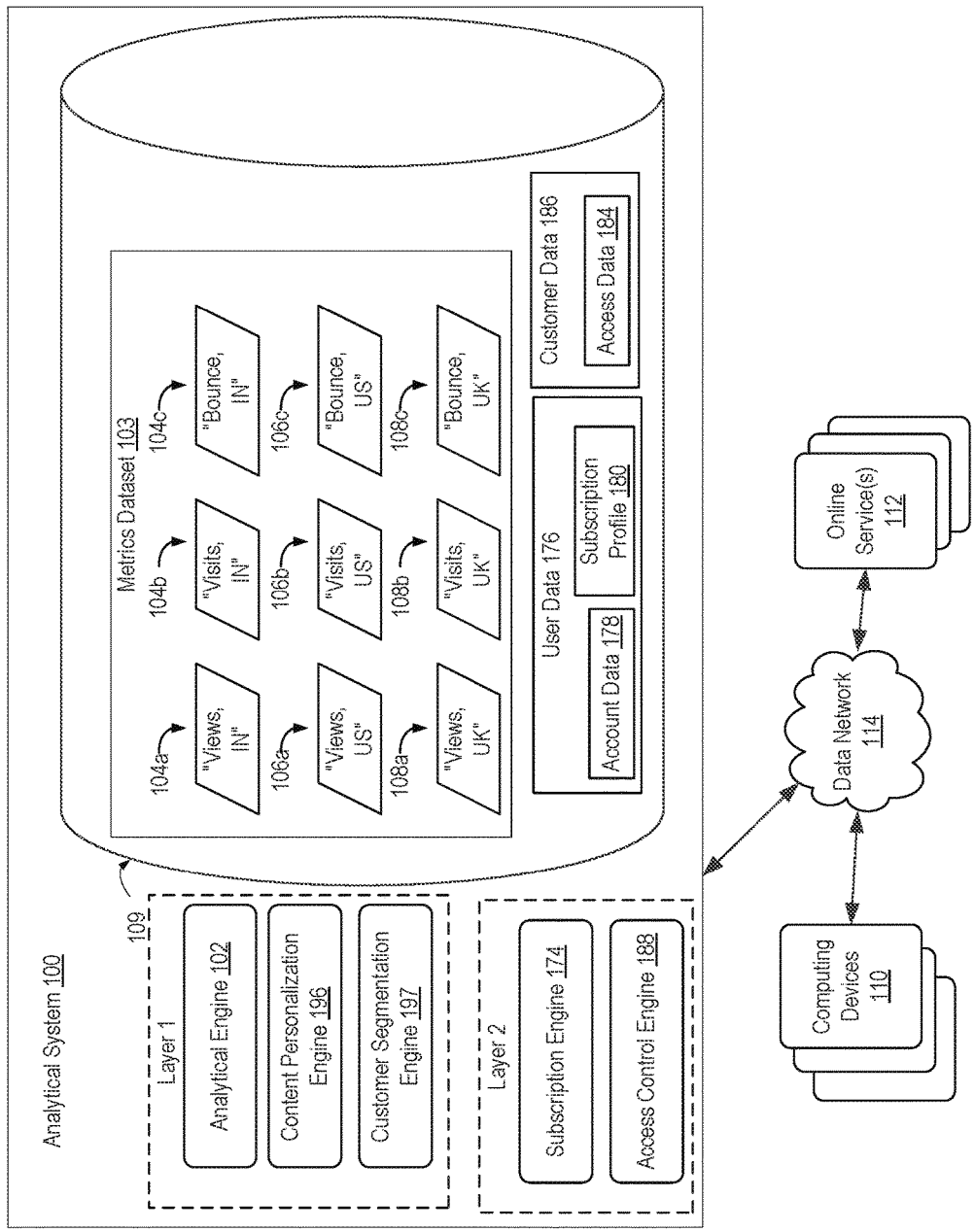
FIG. 1 illustrates an example of a computing environment in which an analytical application identifies significant anomalous segments of a metrics dataset, according to certain embodiments.

Certain embodiments of the present disclosure include systems and methods for identifying significant (e.g., higher-ranked) anomalous segments of a metrics dataset (e.g., a set of page view, clicks, impressions, or other metrics over a given time period). In certain embodiments, an analytics application identifies multiple segments exhibiting anomalous trends. An example of a segment is a subset of a metrics dataset, where the subset includes multiple records or other data items having one or more common features. For instance, a dataset of records describing various metrics (e.g., page visits, network sessions, impressions, etc.) is dividable into segments by filtering on certain attributes (e.g., certain geographic regions, certain device types, etc.) or combinations of attributes that share a common value or range of values. If the metrics data for a certain segment has a trend that differs from the trend exhibited by an entire dataset, the analytics application identifies the segment as anomalous. The analytics application then ranks the anomalous segments in order of importance. This allows more significant anomalies (e.g., higher-ranked anomalous segments) to be isolated for further analysis and corrective action.

The following non-limiting example is provided to introduce certain embodiments. In this example, an analytics application is used for analyzing metrics data describing the usage or performance of an online service. Examples of online services include web-based systems for providing content to end users over data networks. Examples of metrics for the online service include page views, website visits, revenue generated via the online service, and bounce rates. A metrics dataset is divided into segments based on one or more dimensions of the metrics data, such as geography. In one example, a first segment of the metrics dataset includes page views for a first country, a second segment of the metrics dataset includes page views for a second country, a third segment of the metrics dataset includes website visits for the first country, and so on.

Continuing with this example, the analytics application determines which of the segments are anomalous segments. In some embodiments, an anomalous segment is a segment of the dataset having data values exhibiting a first trend that differs from a second trend exhibited by data values in the entire metrics dataset (or some portion thereof). For example, the first segment, which includes page views for the first country, may exhibit a trend that is strongly correlated with the trend in page views for the entire metrics dataset. But each of the second and third segments, which include page view for the second and third countries, may exhibit trends that are uncorrelated or weakly correlated with the trend in page views for the entire metrics dataset. Thus, the analytical application identifies the second and third segments as anomalous segments.

In this example, the analytics application analyzes the anomalous segments to determine which anomalies are most significant, and thereby merit further scrutiny. For instance, the analytics application builds a data graph having nodes that represent the anomalous segments. Each node is connected to each other node in the data graph via an edge. The analytics application assigns a weight to each edge that is used in a ranking algorithm. For instance, a given edge connects a first node representing a first segment to a second node representing a second segment. The edge's weight is determined based on the similarity of these segments as well as the first segment's relationship to the larger metrics dataset. In various embodiments, the first segment's relationship to the larger metrics dataset includes a degree to which the first segment is correlated with the metrics dataset, a degree to which the first segment contributes to the metrics dataset, or some combination thereof. The edge weights enable analysis of the generated data graph by a suitable ranking algorithm, such as the PageRank algorithm. The ranking algorithm identifies, based on the edge weights, ranks for the various nodes and their corresponding segments. One or more higher-ranking segments are identified as significant. The significant segments can be provided, via a data network, to computing devices associated with analysts for further study and analysis.

Certain embodiments provide improvements over existing anomaly-detection algorithms executed by computing systems. For example, the analytics application can apply rules with specific characteristics (e.g., rules that use correlation functions to identify anomalous segments and to rank the identified anomalous segments) that allow for improved anomaly detection that is unavailable to existing systems. Furthermore, certain anomaly-detection algorithms described herein allow significant segment anomalies to be identified that would be otherwise undetectable (or impractical to detect) by human monitoring of data, given the large amounts of data generated by systems that collect and analyze metrics for online services and other computing systems.

As used herein, the term "metrics dataset" is used to refer to a set of data items having at least one data value indicating a metric associated with data network activity and at least one data value indicating an attribute of a computing device involved in the network activity, a user of the computing device, or some combination thereof. Examples of metrics associated with data network activity include clicks, web page visits, online transactions, or other interactions with online services.

As used herein, the term "online service" is used to refer to one or more computing resources, including computing systems that may be configured for distributed processing operations, that provide one or more applications accessible via a data network. The collection of computing resources can be represented as a single service. In some embodiments, an online service provides a digital hub for browsing, creating, sharing, and otherwise using electronic content using one or more applications provided via the online service.

As used herein, the term "data item" is used to refer to a record or other object having values for multiple attributes associated with an online interaction. Examples of a data item include a record with multiple fields, a row having multiple columns, or any other data structure for grouping together multiple data values.

As used herein, the term "segment" is used to refer to a subset of data items from a metrics data set, where the data items in a segment have a common feature. In some embodiments, the common feature is an attribute of a computing devices involved in data network activity. In additional or alternative embodiments, the common feature is an attribute of user of a computing devices involved in data network activity. Examples of attributes include a geographic location of the computing device or the user, a demographic characteristic of the user (e.g., age, income level, etc.), a hardware characteristic of the computing device (e.g., type of computing device, processing resources available, touch-screen capability, etc.), and a software characteristic of the computing device (e.g., operating system, web browser used to conduct network activity, end-user applications involved in network activity, etc.).

Referring now to the drawings, FIG. 1 illustrates an example of a computing environment in which an analytical system 100 is used for identifying significant anomalous segments of a metrics dataset, according to certain embodiments. The computing environment includes the analytical system 100 (which can be included in or otherwise used by a marketing apparatus), one or more computing devices 110, and one or more online services 112. The analytical system 100, computing devices 110, and online services 112 are communicatively coupled via one or more data networks 114 (e.g., the Internet, one or more local area networks, one or more wide area networks, or some combination thereof).

Each of the computing devices 110 is connected (or otherwise communicatively coupled) to a marketing apparatus 110 via a network 114. A user of one of the computing devices 110 uses various products, applications, or services supported by the marketing apparatus 110 via the network 114. Examples of the users include, but are not limited to, marketing professionals who use digital tools to generate, edit, track, or manage online content, or to manage online marketing process, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manages digital experiences.

Digital tools, as described herein, include a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the analytical system 100.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

The analytical system 100 includes one or more devices that provide and execute one or more engines for providing one or more digital experiences to the user. The analytical system 100 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like.

The analytical system 100 also includes a data storage unit 109. The data storage unit 109 can be implemented as one or more databases or one or more data servers. The data storage unit 109 includes data that is used by the engines of the analytical system 100.

In some embodiments, the analytical system 100 can be divided into two layers of engines. For example, Layer 1 includes core engines that provide workflows to the user and Layer 2 includes shared engines that are shared among the core engines. Any core engine can call any of the shared engines for execution of corresponding task. In additional or alternative embodiments, the analytical system 101 does not have layers, and each core engine can have an instance of the shared engines. In various embodiments, each core engine can access the data storage unit 109 directly or through the shared engines.

In some embodiments, the user of a computing device visits a webpage an application store to explore applications supported by the analytical system 100. The analytical system 100 provides the applications as a software as a service ("SaaS"), or as a standalone application that can be installed on one or more of the computing device 110, or as a combination. The user creates an account with the analytical system 100 by providing user details and also by creating login details. In additional or alternative embodiments, the analytical system 100 can automatically create login details for the user in response to receipt of the user details. The user can also contact the entity offering the services of the analytical system 100 and can get the account created through the entity. The user details are received by a subscription engine 174 and stored as user data 176 in the data storage unit 109. In some embodiments, the user data 176 further includes account data 178, under which the user details are stored.

A user can opt for a subscription to one or more engines of the analytical system 100. Based on subscription details of the user, a user subscription profile 180 is generated by the subscription engine 174 and stored. The user subscription profile 180 is stored in the data storage unit 109 and indicates entitlement of the user to various products or services. The user subscription profile 180 also indicates type of subscription, e.g., premium subscription or regular subscription.

Each engine of the analytical system 100 also stores customer data 186 for the user in the data storage unit 109. The user or the entity of the user can have one or more customers, including potential customers, and hence, the one or more engines of the analytical system 100 store the customer data 186. The customer data 186 can be shared across these engines or can be specific to each engine. In some embodiments, the access data 184 is a part of the customer data 186. The access to the customer data 186 is controlled by an access control engine 188 which can be shared across the engines of the analytical system 100 or each engine can have one instance of the access control engine 188. The access control engine 188 determines if the user has access to a particular customer data 186 based on the subscription of the user and access rights of the user.

A user of the analytical system 100 can enable tracking of the content while creating content or at any other point. Various methods of tracking can be used. For example, tracking code can be embedded into the content for tracking and sending tracked data to the analytical engine 102. The analytical engine 102 tracks the data and stores tracked data as metrics data 103 or other analytics data. The analytical engine 102 tracks the data and performs meaningful processing of the metrics data 103 or other analytics data to provide various reports to the user. In addition, in some embodiments, the analytical engine 102 also acts as a shared engine and is accessible by other engines to obtain meaningful analysis on basis of which other engines can offer various functionalities to the user. In additional or alternative embodiments, each engine can have an instance of the analytical engine 102 which is customized according to need of that engine. In various embodiments, the analytical engine 102 is used for tracking one or more types of content, such as mobile applications, video, image, website, document, advertisements, etc. In some embodiments, the analytical engine 102 also supports predictive intelligence to provide predictions based on the metrics data 103 or other analytics data. In some embodiments, the analytical engine 102 also stitches information tracked from various sources where the content is consumed and provides a holistic view (e.g., a 360 degrees' view) of the metrics data 103 or other analytics data.

In some embodiments, the analytical system 100 also includes a content personalization engine 196. The content personalization engine 196 enables the user to provide different digital experiences to the customers when different customers visit same webpage or same application of the user. The content personalization engine 196 provides various workflows to the user to create different versions of the webpage or the application or the content and to perform A/B testing. Based on the testing, the user may choose to provide different personalization for different sets of customers. The content personalization engine 196 also uses the customer data 186. The customer data 186 includes customer profiles. The customers, as described herein, also includes mere visitors which are not customers yet. A profile includes one or more attributes of a customer. An attribute, as described herein, is a concept using which the customer can be segmented. Examples of the attribute include, but are not limited to, geographical location, age, gender, purchase capacity, language, habits, browsing trends, or any other attribute using which the customers can be segmented.

The customer data 186, at least some of which may be included in the metrics data 103 or stored separately from the metrics data 103, is generated by a customer segmentation engine 197 by collecting data from different sources including electronic sources, such as the analytical engine 102, online forms, customer submitting data online, and other online sources, and non-electronic sources including paper forms and other offline sources. The customer data 186 can be shared between users and some of the customer data 186 can be specific to each user and not accessible by other users. The customer segments are used by the content personalization engine 196 to personalize content and show relevant content to the customers. In addition, the content personalization engine provides automated workflows to enable the personalization including providing recommendations for the content that should be shown to a particular customer segment.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by analyzing the customer data 186 and the metrics data 103 or other analytics data, richer customer profiles or segments can be generated. Also, devices that correspond to the same customer can be identified resulting in providing more targeted digital experience to the customer and making benefit for the user.

In some embodiments, the analytical engine 102 accesses a relevant metrics dataset 103 and executes suitable program code for selecting, identifying, and ranking anomalous segments from the metrics dataset 103. For instance, the analytical engine 102 accesses the metrics dataset 103 that includes multiple segments. An example of a metrics dataset is a time series in which data items for a given metric are organized by a time period (e.g., number of page views per day over thirty days). An example of a segment is a time series in which portion of a metrics dataset is filtered based on a common feature with respect to computing devices or users of the computing devices involved in the data network activity.

Each data item in a segment has a first attribute having a metrics data value (e.g., "page views," "bounce rates," "website visits") and a second attribute indicating a feature of a computing device or a user of the computing device that accesses one or more online services via a data network (e.g., a geographic attribute of the computing device or the user, a demographic attribute of the user, a hardware attribute of the computing device, a software attribute of the computing device, etc.). In some embodiments, a common feature for a segment involves data items in the segment sharing a common value for the second attribute. In additional or alternative embodiments, a common feature for a segment involves data items in the segment sharing a common range of values for the second attribute.

For instance, the metrics dataset 103 depicted in FIG. 1 includes segments 104a-c, 106a-c, 108a-c. The segments 104a-c include metrics data describing a first metric (e.g., numbers of page views) for an online service. The segments 106a-c include metrics data describing a second metric (e.g., number of website visits) for an online service. The segments 108a-c include metrics data describing a third metric (e.g., bounce rates) for an online service. Each segment of metrics data is a subset of the metrics dataset 103 having a common feature with respect to a geographic location in which certain computing devices accessed one or more of the online service 112 (i.e., a common feature with respect to computing devices).

In some embodiments, metrics datasets are divided into certain data dimensions, such as (but not limited to) dimensions identifying geographic regions associated with online activities, dimensions identifying demographic traits associated with online activities, dimensions identifying different device types used to conduct online activities, or other suitable data dimensions. For instance, in the example depicted in FIG. 1, the "page views" metric is divided based on geographic dimensions, where the segment 104a includes page views associated with interactions originated by computing devices in India, the segment 104b includes page views associated with interactions originated by computing devices in the United States, and the segment 104c includes page views associated with interactions originated by computing devices in the United Kingdom. Likewise, the "website visits" metrics data includes a segment 106a associated with India, a segment 106b associated with the United States, and segment 106c associated with the United Kingdom. The metrics data for bounce rates and exit events is similarly organized according to geographic dimensions (i.e., attributes common to the segments).

In some embodiments, the analytical engine 102 processes data received from one or more online services 112, data generated from interactions with one or more online services 112 by computing devices 110, or any other data associated with one or more online services 112. The various metrics datasets in the metrics dataset 103 are generated from interactions by the computing devices 110 with the online services 112. The online services 112 provide applications, data, and other functions that are accessed by one or more computing devices 110 via the Internet or one or more other suitable data networks 114. Examples of the online services 112 include (but are not limited to) social media websites, websites for purchasing products or services, etc.

The computing devices 110 execute respective user applications that are used to access the online services 112. In some embodiments, one or more of the computing devices executes includes at least one application supported by the analytical system 100. Examples of the user applications include, but are not limited to, web browsers for accessing websites provided by the online services and applications specific to the online services. Examples of the computing devices 110 include, but are not limited to, a personal computer ("PC"), tablet computer, a desktop computer, a processing unit, any combination of these devices, or any other suitable device having one or more processors.

In some embodiments, the metrics dataset 103 includes data that is automatically generated or automatically provided to an analytical system 100 or other server system as a result of computing devices 110 interacting with an electronic message, web pages, or other electronic content provided via the online services 112. For example, electronic content provided by an online service 112 may include program code that causes a notification to be transmitted from a computing device 110 to the analytical system 100 (or another server system) in response to the electronic content being manipulated, used, or otherwise accessed at the computing device 110. The notification can be transmitted to the analytical system 100 (or another server system) without notifying a user of the computing device 110.

In other embodiments, the metrics dataset 103 includes data that is provided to an analytical system 100 or other server system as a result of the computing device 110 accessing the online services 112 via one or more electronic messages. For example, a link to an online service 112 that is included in an electronic message may include a URL parameter that causes a web server, which provides access to the online service 112, to notify the analytical system 100 (or another server system) that a link has been clicked. A non-limiting example of the parameter is an alphanumeric string that provides an identifier for a campaign involving the transmission of the electronic messages. The web server can use the identifier included in the URL parameter to uniquely identify a visit to the website. The web server can respond to receiving the URL parameter by notifying the analytical system 100 (or another server system) that a computing device 110 to which an electronic message was transmitted accessed the an online service 112 during a certain time period.

Figure 2:
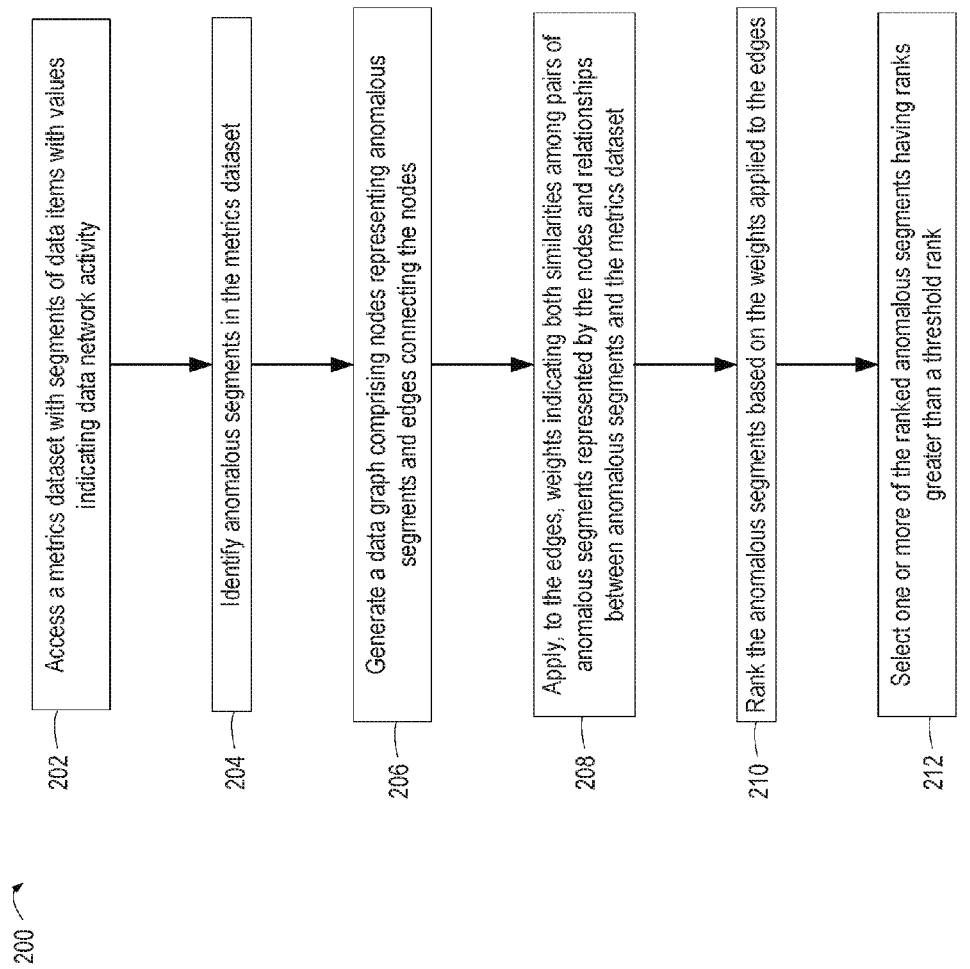
FIG. 2 illustrates an example of a method for identifying significant anomalous segments of a metrics dataset, according to certain embodiments.

In some embodiments, the analytical system 100 is used for identifying and ranking anomalous segments from the metrics dataset 103. For instance, FIG. 2 illustrates an example of a method 200 for identifying significant anomalous segments of a metrics dataset. In some embodiments, one or more processing devices, such as the computing system described herein with respect to FIG. 7, implement operations depicted in FIG. 2 by executing suitable program code (e.g., the analytical engine 102) that implements one or more algorithms encompassed by the method 200.

For illustrative purposes, the method 200 is described with reference to the examples depicted in FIGS. 1 and 3-7. Other implementations, however, are possible.

At block 202, the method 200 involves accessing a metrics dataset with segments of data items, the values of which indicate data network activity. For example, one or more processing devices execute the analytical engine 102 to access the metrics dataset 103.

In some embodiments, the analytical engine 102 accesses the metrics dataset 103 from a non-transitory computer-readable medium that is local to the computing system that executes the analytical engine 102. Accessing the metrics dataset 103 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the analytical engine 102.

In additional or alternative embodiments, the analytical engine 102 accesses, via a data network 114, at least some of the metrics dataset 103 from a non-transitory computer-readable medium that is remote from the computing system that executes the analytical engine 102. Accessing the metrics dataset 103 involves transmitting suitable electronic signals via a network interface device that communicatively couples, via a data network, a computing system that executes the analytical engine 102 with another computing system that is communicatively coupled to the non-transitory computer-readable medium via a data bus or other form of local access. These signals cause at least some of the data from the non-transitory computer-readable medium to be transmitted over the data network, received via the network interface device of the computing system that executes the analytical engine 102, and stored in a random-access memory or other memory device that allows rapid retrieval of data for processing operations performed by the computing system that executes the analytical engine 102.

The metrics dataset accessed at block 202 includes data items (e.g., data samples, records, etc.) having metrics values. In some embodiments, metrics values indicate data network activity, such as a number of website visits, a number of page views, interactions with web pages (e.g., clicks, purchases, etc.), and other electronic transactions involving the online services 112. The metrics dataset includes segments. Each segment includes a respective subset of the data items having one or more common features with a participant in the data network activity (e.g., computing devices or users of the computing devices involved in the data network activity).

At block 204, the method 200 involves identifying anomalous segments in the metrics dataset. For example, one or more processing devices executes the analytical engine 102 to perform an anomaly detection algorithm. The anomaly detection algorithm identifies segments having segment trends that deviate from a trend associated with a larger portion of the metrics dataset 103 (e.g., the entire metrics dataset 103 or all metrics values for a particular metric).

In some embodiments, the anomaly detection algorithm includes one or more operations that identify a set of candidate segments. The anomaly detection algorithm involves selecting the anomalous segments from the set of candidate segments. The analytical engine 102, when executing the anomaly detection algorithm, may identify the candidate segments based on user inputs received from one or more computing devices 110. For one or more of the candidate segments, the analytical engine 102 computes, during the anomaly detection algorithm, a correlation coefficient between the candidate segment and a larger portion of the metrics dataset 103 (e.g., the entire metrics dataset 103 or all metrics values for a particular metric).

The analytical engine 102 computes the correlation coefficient using any suitable correlation function. Examples of suitable correlation functions include, but are not limited to, a Pearson product-moment correlation, a first-order temporal correlation coefficient, or any other function that identifies the degree to which two sets of metrics are correlated. The analytical engine 102 retrieves code for performing the correlation function from a non-transitory computer-readable medium (e.g., by communicating suitable signals to a non-transitory computer-readable medium via a data bus or a data network). The analytical engine 102 then executes the retrieved code using one or more data items from the accessed metrics dataset 103 as inputs. The analytical engine 102 outputs a correlation coefficient that is computed using the executed code.

The correlation coefficient indicates whether a segment trend for a given candidate segment is anomalous with respect to a normal or expected trend defined by a larger portion of the metrics dataset 103 (e.g., the entire metrics dataset 103). Lower values of a correlation coefficient indicate greater deviation between the candidate segment and the larger portion of the metrics dataset 103. Additionally or alternatively, a correlation coefficient having a negative sign indicates greater deviation (e.g., opposite trends) between the candidate segment and the larger portion of the metrics dataset 103. If the analytical engine 102 compares the computed correlation with a threshold correlation and finds a sufficient difference (e.g., the correlation coefficient being less than the threshold correlation), the analytical engine 102 identifies the candidate segment as anomalous.

Figure 3:
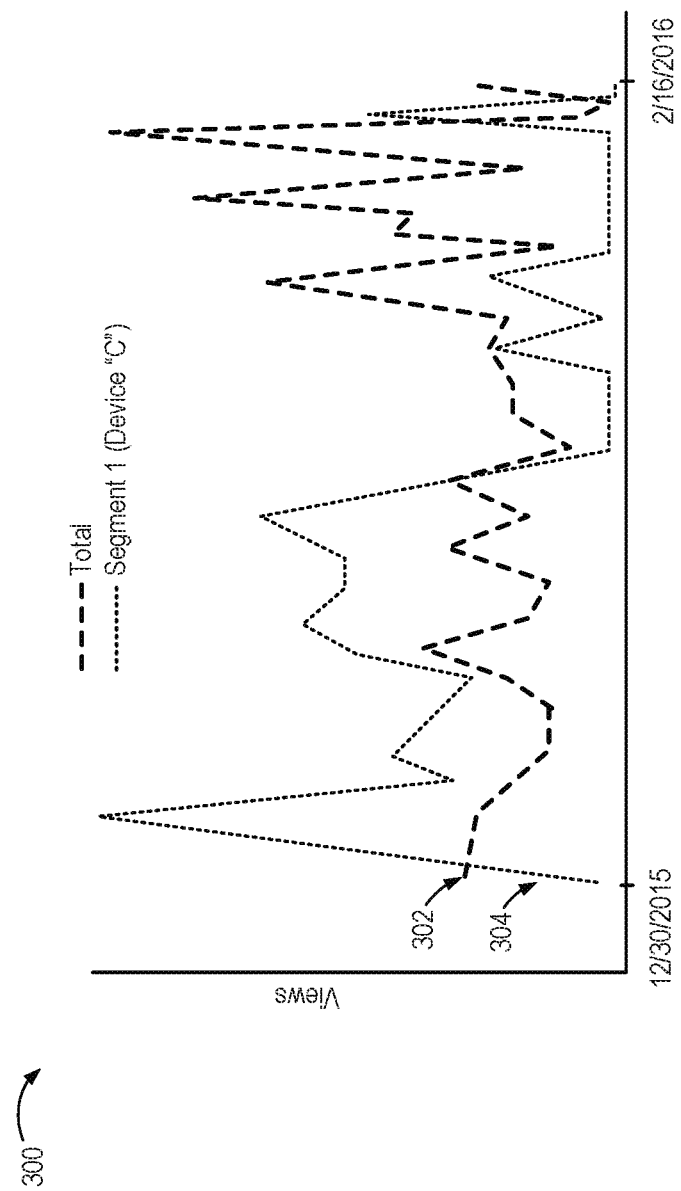
FIG. 3 illustrates an example of an anomalous segment having a trend that deviates from the trend of a larger metrics dataset to which the anomalous segment belongs, according to certain embodiments.

For example, FIG. 3 illustrates an example of an anomalous segment having a trend that deviates from the trend of a larger metrics dataset to which the anomalous segment belongs. In the graph 300, the dashed curve 302 denotes metrics values (e.g., page views) from the total-metric time series or other metrics dataset 103. The dotted curve 304 denotes metrics values from a candidate segment (e.g., a certain type of computing device). The segment data corresponds to page views that resulted from communications with the selected type of computing device. The curve 302 and the curve 304 have trends that visibly differ from one another. This difference in trends results in a low correlation coefficient being computed by the analytical engine 102 using one or more of the operations described above. Thus, the analytical engine 102 identifies the segment corresponding to the curve 304 as an anomalous segment based on the low correlation coefficient.

Candidate segments may be identified for block 204 using any suitable process. In some embodiments, an analyst or other user, based on his or her domain knowledge and expertise, provides input to the analytical engine 102 that specifies the segments that are likely to behave anomalously. In some embodiments, the analytical engine 102, when being executed by a processing device and performing an algorithm corresponding to the method 200, accesses these inputs from a non-transitory computer-readable medium that is included in or otherwise accessible to a computing system that executes the analytical engine 102. The inputs can be received via one or more devices that are communicatively coupled to the non-transitory computer-readable medium, such as a network interface device, an input device (e.g., keyboard, touchscreen, mouse, etc.), or any combination thereof. Data corresponding to the received inputs can be stored in the non-transitory computer-readable medium for use by the analytical engine 102.

The user inputs specifying these segments are used by the analytical engine 102 to generate the set of candidate segments to be tested for identifying anomalies. For instance, the analyst may know, from his or her past experience, that metrics generated from computing devices in a certain region tend to behave anomalously or that users having certain characteristics are particularly valuable from a marketing perspective. The analyst, by providing the inputs described above, configures the analytical engine 102 to select segments containing that region as candidate segments and perform anomaly detection on these candidate segments. In additional or alternative embodiments, other automated algorithms identify one or more of the candidate segments upon which anomaly detection is to be performed.

Returning to FIG. 2, at block 206, the method 200 involves generating a data graph with nodes representing anomalous segments and edges connecting the nodes. For example, one or more processing devices execute the analytical engine 102 to generate a data graph. The data graph may be generated in any suitable manner. In one example, the analytical engine 102 generates, updates, or otherwise accesses a database or other data structure having records. Each record includes fields for identifying a node, relationships to other nodes (e.g., connections represented by edges, edge weights, etc.), and any other suitable information about a given node. In another example, the analytical engine 102 generates, updates, or otherwise accesses the data graph using a suitable data format, such as JavaScript Object Notation ("JSON"). For instance, a graph can be a JSON document having a hierarchy of data objects, where each data object (e.g., a JSON blob) represents or otherwise corresponds to a particular anomalous segment. In another example, the analytical engine 102 generates, updates, or otherwise accesses a matrix having i rows and j columns corresponding to different anomalous segments. A non-zero value at the matrix entry (i,j) indicates an edge between the ith segment and the jth segment. A processing device that executes the method 200 can generate, update, or otherwise access any of these data structures by communicating suitable electronic signals via a data bus that communicatively couples the non-transitory computer-readable medium and the processing device, by communicating suitable electronic signals via a network interface device that communicatively couples the non-transitory computer-readable medium and the processing device, or some combination thereof.

Figure 4:
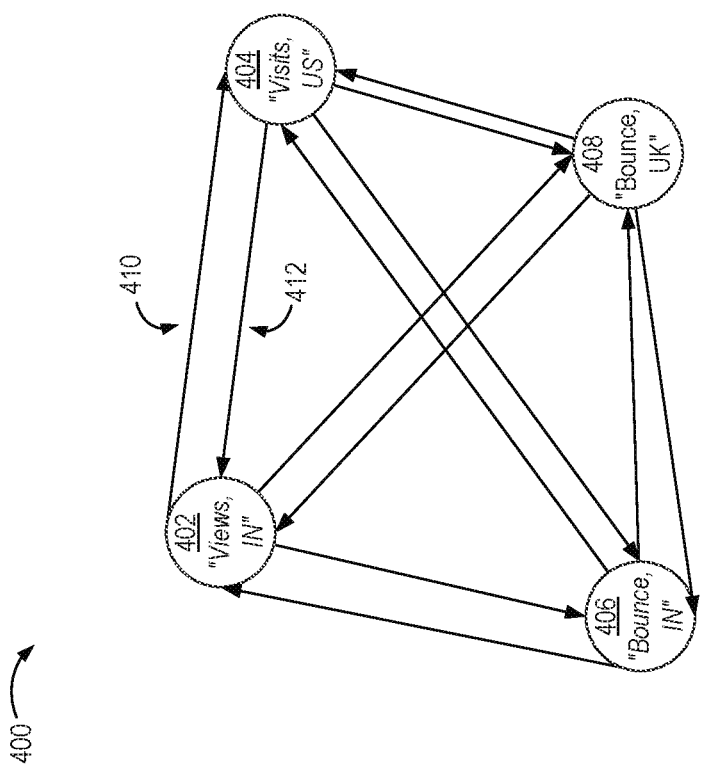
FIG. 4 illustrates an example of a data graph generated by the analytical application of FIG. 1 for ranking significant anomalous segments of a metrics dataset, according to certain embodiments.

FIG. 4 illustrates an example of a data graph 400 generated at block 206. The data graph 400 includes nodes 402, 404, 406, 408. Each node corresponds to a segment that the analytical engine 102 identifies as being anomalous with respect to the metrics dataset 103 (e.g., "Views, IN," "Visits, US," "Bounce, IN," "Bounce, UK"). The data graph also includes edges connecting the nodes 402, 404, 406, 408. In some embodiments, each pair of nodes in the data graph 400 is connected by a pair of unidirectional edges. For instance, the edges 410, 412 connect the nodes 402, 404. The edge 410 extends from the node 402 to the node 404, and the edge 412 extends from the node 404 to the node 404. Using pairs of unidirectional edges allows certain ranking algorithms, such as the PageRank algorithm, to be applied to the data graph, as described in detail herein.

Returning to FIG. 2, at block 208, the method 200 involves applying, to the edges, weights indicating both similarities among pairs of anomalous segments represented by the nodes and relationships between anomalous segments and the metrics dataset. For example, one or more processing devices can execute the analytical engine 102 to compute the weights and update a data structure representing the data graph to include the computed weights. For example, if a matrix is used to indicate the graph, a value at the matrix entry (i,j) is updated to reflect the weight of an edge, and the nonzero value thereby indicates both the presence of an edge between the ith segment and the jth segment and the weight of the edge. In some embodiments, the analytical application generates each weight based on one or more of a similarity score, a correlation score, and a contribution score for a given segment represented by a node connected to the edge.

The similarity score indicates a degree of similarity between the two segments whose corresponding nodes are connected by the edge. In some embodiments, the analytical engine 102 executes a natural-language-processing ("NLP") algorithm to identify similarities between labels applied to different metrics. For example, the analytical application may determine that a segment labeled "revenue per click" is more similar to a segment labeled "revenue per impression" (due to both labels sharing the term "revenue") and less similar to a segment labeled "cost per impression." The execution of NLP can identify similarities more accurately than reliance on user inputs to identify similar metrics. For example, if a user merely identifies which segments to be used, and is not required to provide additional inputs identifying which segments are considered to be more or less similar, the evaluation of similarities (e.g., via an NLP algorithm) is less prone to errors due to oversights by analysts or other users that may configure the analytical engine 102 to perform the method 200.

Natural language processing involves one or more suitable processes and procedures for automatically identifying logical portions of a string for comparison in a natural language. For example, the analytical engine 102 may perform operations such as stemming, removing irrelevant words, tokenization, and n-gram determination for labels of segments. Stemming can include converting words and phrases to their root form. Removing irrelevant words can include removing stop words or words without any semantic relationship to other words, such as prepositions or adjectives that are not used to identify a given entity. Tokenization can include parsing or otherwise splitting text into elements. An element can be a word, such as a proper name, or a phrase, such as a noun coupled with an adjective (e.g., "United States"). The analytical engine 102 compares different segment labels after performing one or more of these processes to determine a degree of similarity between two segment labels.

In additional or alternative embodiments, one or more other measurements of similarity may be used by the analytical engine 102. In one example, the analytical engine 102 may compute a correlation coefficient for two segments to determine whether their trends are correlated with one another. In another example, the analytical engine 102 may compare correlation scores, contribution scores, or both for two segments to determine the degree to which the segments have a similar correlation with the metrics dataset 103, a similar contribution to the metrics dataset 103, or both.

The correlation score indicates a correlation between the metrics dataset 103 and the segment represented by the node. In various embodiments, the correlation score is the same correlation coefficient computed at block 204 or is another value that is computed based on the correlation coefficient obtained at block 204 (e.g., a scaled or normalized version of the correlation coefficient). Examples of suitable correlation functions for computing the correlation score include, but are not limited to, a Pearson product-moment correlation, a first-order temporal correlation coefficient, or any other function that identifies the degree to two sets of metrics (e.g., the metrics dataset 103 and a segment thereof) are correlated.

The contribution score indicates a contribution of the segment to the metric volume of the metrics dataset 103. In some embodiments, the contribution score is calculated from a ratio between a sum of metrics values in the segment and a sum of metrics values in a large portion of the metrics dataset 103 (e.g., the metrics dataset 103). For instance, the metrics dataset 103 be a number of clicks that occurred each day over a thirty-day period. The analytical engine 102 determines or otherwise identifies the sum of clicks over the thirty-day period for the metrics dataset 103 as a whole and the sum of clicks over the thirty-day period for just the anomalous segment under consideration. If the number of clicks for the segment was 300 and the number of clicks for the entire metrics dataset 103 was 1000, the contribution score is 0.30 (e.g., 300 clicks for the segment divided by 1000 total clicks in the metrics dataset 103).

In additional or alternative embodiments, the entire metrics dataset 103 may be considered a n×m matrix defining an n-dimensional metric volume, and a given segment may be considered to be a smaller matrix defining a portion of the n-dimensional metric volume. In this example, the contribution score indicates the percentage of the total n-dimensional metric volume that is defined by the portion of the n-dimensional metric volume corresponding to the segment.

Figure 5:
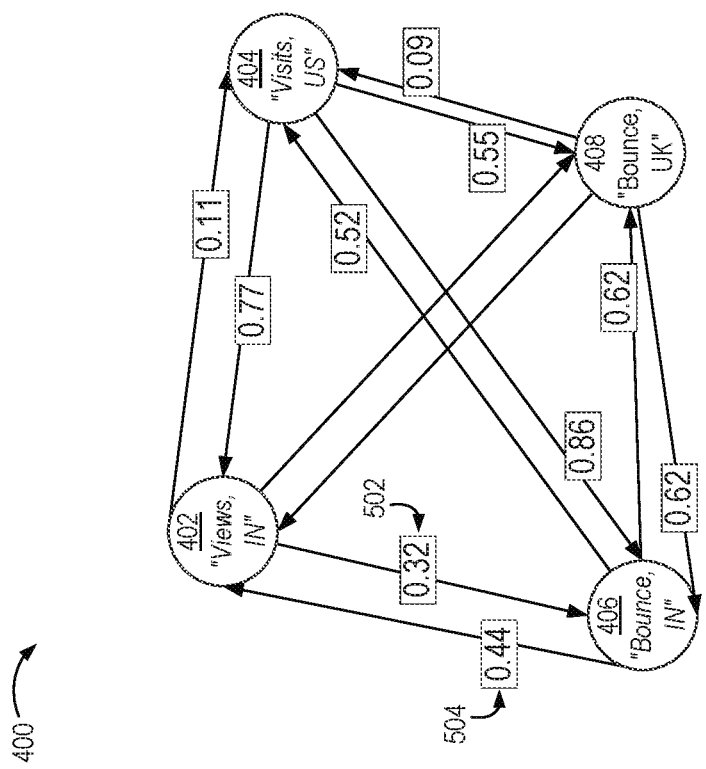
FIG. 5 illustrates an example in which edges of the data graph of FIG. 4 are weighted to enable the ranking of the segments, according to certain embodiments.

FIG. 5 illustrates an example in which edges of the data graph 402 are weighted using the weights computed at block 208. In some embodiments, one or more of the correlation score, the contribution score, and the similarity score are calculated for a segment whose corresponding node originates an edge. For instance, the weight 502 is calculated based at least partially on a contribution score, a correlation score, and a similarity score computed for the node 402 representing the "View, IN" segment, and the weight 504 is calculated based at least partially a contribution score, a correlation score, and a similarity score computed for the node 406 representing the "Bounce, IN" segment. In additional or alternative embodiments, one or more of the correlation score, the contribution score, and the similarity score are calculated for a segment whose corresponding node terminates an edge. The use of a node originating the edge or the node terminating the edge can be selected based on which ranking algorithm is applied to the data graph 400.

In some embodiments, a given edge weight is a sum of the correlation score as computed, the contribution score as computed, and the similarity score as computed. In other embodiments, the analytical engine 102 applies score weights to one or more of the correlation score, the contribution score, and the similarity score. A score weight is a weight indicating the degree to which the analytical engine 102 considers a particular category (e.g., correlation, contribution, similarity) when computing an edge weight for a given edge. For instance, an edge weight W may be calculated from the weighted sum W=S1×Corr+S2×Contrib+S3×Sim. In this formula, S1, S2, and S3 are score weights. Furthermore, Corr is the correlation score, Contrib is the contribution score, and Sim is the similarity score.

In some embodiments, the analytical engine 102 identifies score weights from user inputs. For instance, a computing device 110 may present an interface that allows a user to input one or more of S1, S2, and S3 or to modify default values (e.g., "1") for one or more of S1, S2, and S3. The computing device 110 transmits the inputted score weights to the analytical engine 102.

In additional or alternative embodiments, the analytical engine 102 generates score weights based on an analysis of one or more aspects of the metrics dataset 103. For example, if the analytical engine 102 uses an NLP algorithm to generate similarity scores, the analytical engine 102 may analyze the labels applied to different segments to determine the utility of the similarity score. If the segment labels do not exhibit a large amount of variation, the similarity score may have less value for differentiating segments in the graph 400. Additionally or alternatively, if the segment labels are insufficiently descriptive (e.g., "Segment 1234" instead of "Impressions"), then similarities in the labels may have less value for differentiating segments in the graph 400. The analytical engine 102 can determine how "descriptive" certain labels are by determining whether tokens from the label (e.g., the word "revenue" by tokenizing the label "revenue_India") can be matched to a natural language word or phrase with a sufficiently high degree of confidence.

In some embodiments, the combination of the correlation score and the contribution score provides an improved measure of a given segment's relationship to the metrics dataset 103 than either score would provide alone. For instance, if a given anomalous segment has a high correlation with the metrics dataset 103 but accounts for a small contribution to the volume of metrics space, then relying on the correlation alone would exaggerate the relevance of that anomalous segment. Conversely, if a given anomalous segment has a low correlation with the metrics dataset 103 but accounts for a large contribution to the volume of metrics space, then relying on the correlation alone would undervalue the relevance of that anomalous segment. Using both scores allows the relationship between a given segment and the metrics dataset 103 to be accurately reflected in the data graph.

A processing device that executes the method 200 can perform block 208 by communicating suitable electronic signals via a data bus that communicatively couples the non-transitory computer-readable medium and the processing device, by communicating suitable electronic signals via a network interface device that communicatively couples the non-transitory computer-readable medium and the processing device, or some combination thereof. For example, the processing device can communicate signals (e.g., via a data bus or data network) to access the data graph from a non-transitory computer-readable medium and to access program code for applying weights to edges of the graph. The processing device can execute the program code for applying the weights. Executing the program code can cause the processing device to update the stored version of the data graph (e.g., one of the data structures identified above) with respect to block 206 with the applied weights.

Returning to FIG. 2, at block 210, the method 200 involves ranking the anomalous segments based on the weights applied to the edges. For example, one or more processing devices execute the analytical engine 102 to rank the anomalous segments. The one or more processing devices can access the anomalous segments from a non-transitory computer-readable medium (e.g., by communicating appropriate signals via a data network or data bus) and can access program code that includes a ranking algorithm from a non-transitory computer-readable medium. The processing devices execute the accessed program code using the accessed anomalous segments as inputs, which causes the processing device to output ranked anomalous segments.

In some embodiments, the analytical engine 102 executes program code that implements the PageRank algorithm and that uses the data graph 400 as input data to the PageRank algorithm. Executing the PageRank algorithm assigns a significance score to each segment represented in the data graph 400. The analytical engine 102 uses the significance scores to rank the anomalous segments.

In some embodiments, the PageRank algorithm is applied to a modified version of the data graph generated at block 206, where the graph is modified to eliminate edges having an insufficiently high edge weight. For instance, a threshold weight of 0.6 may be used to eliminate edges from the graph 400. A computing system that executes the analytical engine 102 can access the graph 400 from a non-transitory computer-readable medium (e.g., by communicating suitable signals via a data bus or data network) and can modify the data structure that implements the graph 400 to eliminate one or more edges (e.g., by changing a value representing the presence of an adage into a value representing the absence of an edge).

Figure 6:
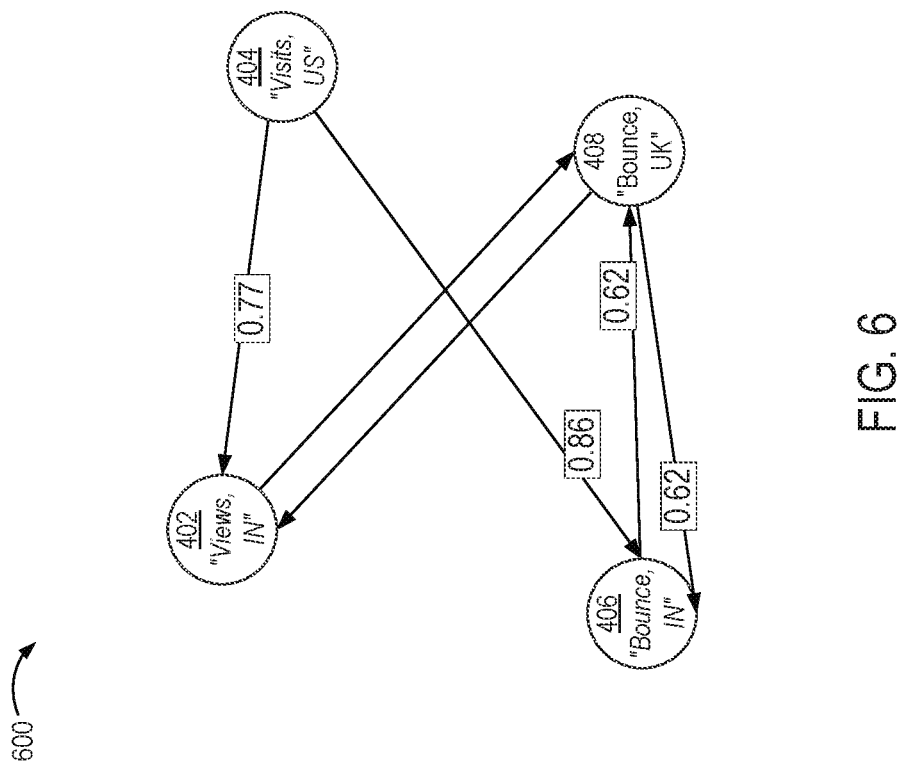
FIG. 6 illustrates an example in the data graph of FIG. 5 has been modified to remove edges with weights lower than threshold weight, according to certain embodiments.

FIG. 6 is a diagram depicting a modified graph 600 that is generated by eliminating edges from the graph 400 having a weight of 0.6 or less. The analytical engine 102 applies the PageRank algorithm to this modified graph. R' is a vector of ranks assigned to respective nodes from the graph, where the nodes are a set of nodes $B_u$ from the data graph that satisfy the following formula such that c is maximized and the magnitude of the L1 norm of R' is equal to 1:

$$R'(u) = c \sum_{v \in B_u} \frac{R'(v)}{N_v} + cE(u).$$

In this formula, R'(u) is the rank of node u, c is a normalization factor, R'(v) is the rank of a node v having an edge from the node v to the node u, $N_v$ is the number of out-edges from the node v (i.e., edges with directions from the node v and toward other nodes), and E is a user-defined vector which is a source of ranks for preventing rank sinks, where E(u) is the entry in E corresponding to node u.

Any suitable values may be used for the vector E. In some embodiments, an E(u) value for a given node u includes (or is generated from) one or more of a correlation score for the segment represented by the node u, a contribution score for the segment represented by the node u, a sum of edge weights for edges directed toward the node u, a sum of edge weights for edges directed away the node u, etc. In other embodiments, the vector E may include uniform values for all nodes in the graph to which the PageRank algorithm is applied. The vector E with uniform values may have a L1 norm with a magnitude corresponding to a random navigation to different nodes of the graph (e.g., a magnitude of 0.15).

In additional or alternative embodiments, the analytical engine 102 applies a modified version of the PageRank algorithm. For example, instead of dividing the rank R'(v) (i.e., the rank of a node v having an edge from the node v) by the number of out-edges $N_v$, the analytical engine 102 applies an edge weight to the rank R'(v). An example of a ranking formula for generating a rank R(u) for a node u is:

$$R(u)=c\Sigma_{v \in B_u} W_v R(v).$$

In this formula, R(u) is the rank of node u, c is a normalization factor, R(v) is the rank of a node v having an edge from the node v to the node u, and $W_v$ is an edge weight for the edge from the node v to the node u. The edge weight $W_v$, is calculated at block 208.

At block 212, the method 200 involves selecting one of the ranked anomalous segments based on that anomalous segment having a rank that is greater than a threshold rank. One or more processing devices executes the analytical engine 102 to select one or more of the anomalous segments. For example, a processing device that executes the analytical engine 102 can communicate suitable signals (e.g., via a data bus or a data network) to a non-transitory computer-readable medium to retrieve the selected segments.

In one example, the analytical engine 102 transmits or otherwise outputs data identifying one or more of the anomalous segments having a sufficiently high rank (e.g., the highest-ranked segment). The analytical engine 102 configures a presentation device, a network interface device, or another suitable output device to output the selected segments at a computing device used by an analyst. Outputting the selected segments can include configuring a display device to render visual representations of the selected segments for display, transmitting one or more messages via a data network that include data describing the selected segments, etc. The analyst may perform additional analysis on the identified segment.

In some embodiments, at least some of the operations depicted in FIG. 2 are performed in an automated, unsupervised manner. For example, other than the user input that identifies one or more dimensions for segmenting the metrics dataset 103 and that identifies one or more metrics to be analyzed, the analytical engine 102 analyzes segments, identifies anomalous segments, and performs the operations involved in ranking the anomalous segments (e.g., graph-generation, weighting, and analysis) without human intervention.

By identifying anomalous segments in the manner described herein, certain embodiments of the analytical engine 102 provide computer-implemented improvements that address problems that involve tracking network activity. Examples of problems that involve tracking network activity include identifying communication problems over the Internet and data networks, increasing engagement with customized online content that requires access via the Internet and data networks, etc. The method 200 allows these problems to be addressed by identifying and ranking anomalous segments in a manner that would be infeasible without the computed-implemented embodiments described herein. For instance, the method 200 allows anomalous segments to be consistently identified and ranked even if large volumes of data (e.g., thousands or millions of data items) are used to define the metrics and associated trends.

In one example, the identification of anomalous segments may allow communication problems in data centers or hubs of an online service to be identified and addressed. For instance, anomalous metrics related to latency that are specific to computing devices in certain geographic regions may be used to more effectively identify problems with communication equipment servicing those geographic regions. Use of the automated method described above can allow these problems to be identified without human intervention, and thereby prevent additional delays and problems with network communication that would otherwise result from relying on human intervention to notice or otherwise detect anomalous network activity. Other examples of network-related problems addressed by anomaly detection algorithms, which are improved by certain embodiments described herein, include identifying malware, identifying suspicious activity indicating an intrusion into a data network, or identifying performance levels associated with an online service.

In some embodiments, the analytical engine 102 is used to find anomalies in data that may not be identified by analyzing an entire metrics dataset (e.g., a metrics dataset without apparent point anomalies or context anomalies). For instance, if a first segment of the metrics dataset (e.g., website visits originating from a first search engine) exhibits an anomalously large number of website visits and a second segment of the metrics dataset (e.g., website visits originating from a first search engine) exhibits an anomalously small number of website visits, the large number of visits may offset the small number of visits when all data is aggregated together. But the analytical engine 102 described herein, which identifies and ranks anomalies particular to certain segments, may highlight these anomalously performing segments to an analyst who would otherwise fail to detect the anomalies.

In another example, the identification of anomalous segments may allow online content to be customized for effectively for certain online visitors. For instance, online services may build entity profiles (e.g., visitor profiles) from interactions with the online services by computing devices. A given device, online user profile, or other electronic entity may be assigned a visitor identifier, which can be stored in a cookie, and used to associate various online interactions with the identifier. The electronic data describing the online interactions is gathered as entities interact with online services. The aggregated data from thousands of online entities allows for analytics to be developed, which in turn allows online content to be optimized or otherwise customized to elicit further user interactions from certain desirable segments of online entities. Given the volume of this interaction data, identifying anomalous segments without an unsupervised, automated solution provided by the analytical engine 102 may be infeasible. The analytical engine 102, as described herein, provides improvements in anomaly detection that enable customization of online content.

In another example, online marketing campaigns generate interaction data (e.g., clicks, online conversions, etc.) that is used to analyze the behavior of campaigns over a period of time. This analysis includes finding online campaigns that are not eliciting a desirable number of online interactions (e.g., clicks, impressions, etc.), a desirable type of online interactions, or both for certain segments of online entities. The analytical engine 102 described herein may be used to analyze a metric time-series corresponding to clicks, impressions, or both for certain campaigns that have an opposite or otherwise deviant trend as compared to a total metric time-series corresponding to clicks, impressions, or both for all campaigns. The segments (e.g., certain campaigns, certain campaign-city combinations, etc.) identified using the analytical engine 102 are marked as anomalous and ranked for further analysis. The analyst can take corrective measures for these segments.

In another example, the analytical engine 102 enables user segments to be identified that should be targeted with appropriate online content (e.g., online advertisements). Before targeting the group of users, the analytical engine 102 enables analysts to understand preferences of certain segments. For example, if a metrics dataset 103 describes purchases by one or more online vendors, segments defined by product and age group attributes can be used to identify anomalous trends for purchasing metrics. A metric time series for a segment(e.g., "age group" of 20-25 years and a "product" of p1) may exhibit a trend that is opposite from or otherwise deviates from a trend exhibited by a total-metric time series. This indicates that the segment of users may lack interest in the product under consideration. Using these anomalous segments, an analyst can take various appropriate decision for targeting the user segments with appropriate online content.

In another example, the analytical engine 102 enables the identification of user segments that are targeted, but that have not interacted with targeted online content. For example, if an online advertisement has been targeted to certain user segments (e.g., males of ages 25-30 years) and the revenue metric time-series for this segment exhibits a trend that is opposite from or otherwise deviates from a trend exhibited by a total-metric time series, an analyst can take action to stop targeting this segment or take corrective measures.

System Implementation Example

Figure 7:
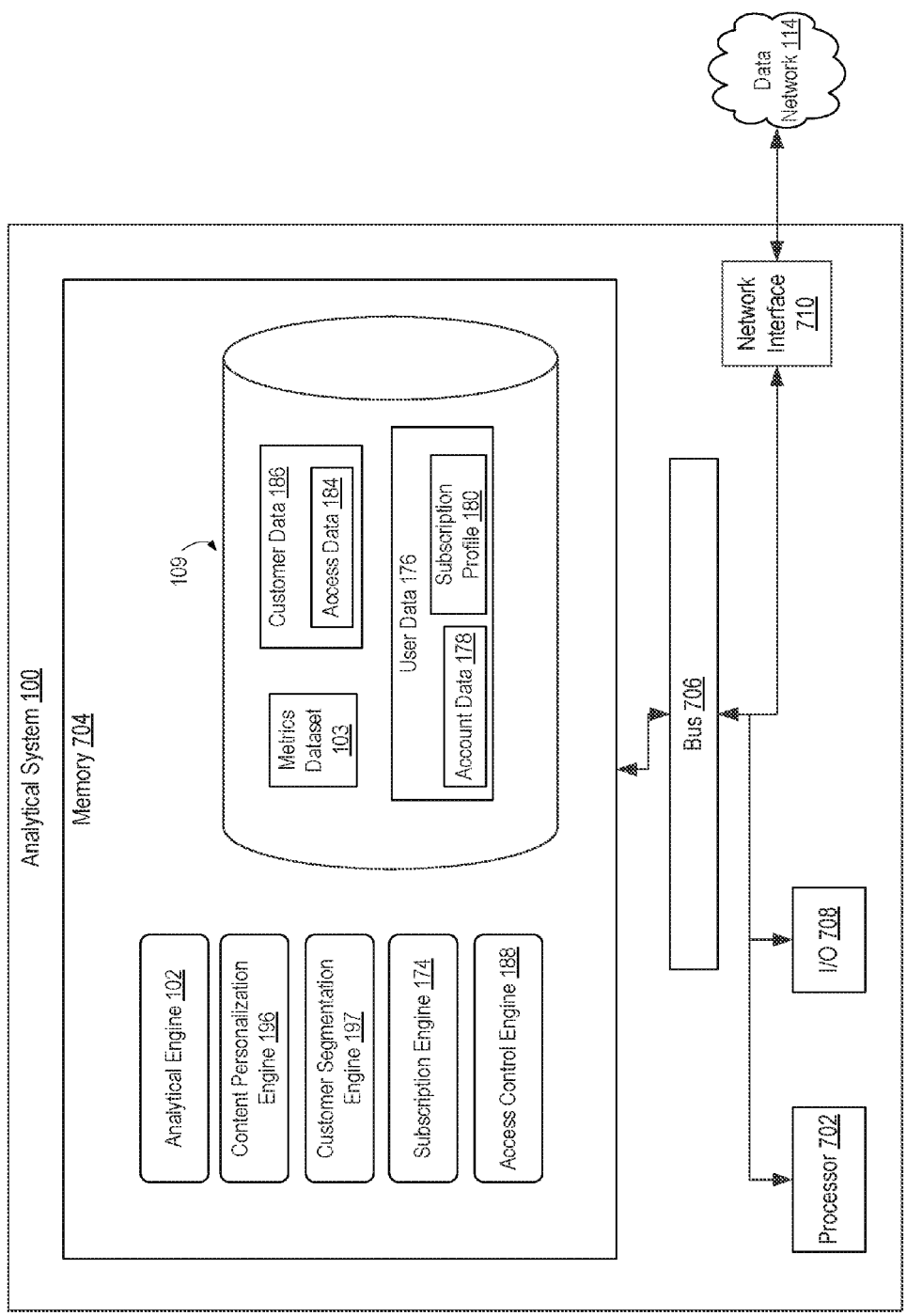
FIG. 7 illustrates an example of a computing system that executes an analytical application for identifying significant anomalous segments of a metrics dataset, according to certain embodiments.

Any suitable computing system or group of computing systems can be used for performing the operations described herein. FIG. 7 illustrates an example of an analytical system 100 that executes the analytical engine 102 to perform the operations described herein.

The depicted example of the analytical system 100 includes one or more processors 702 communicatively coupled to one or more memory devices 704. The processor 702 executes computer-executable program code stored in the memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including one. One or more processors 702 are configured by program code to implement the operations described above, such as the operations depicted in FIG. 2 that are described with respect to processing devices.

The memory device 704 includes any suitable non-transitory computer-readable medium for storing the analytical engine 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 704 are used to implement the operations described above, such as the operations depicted in FIG. 2 that are described with respect to one or more non-transitory computer-readable media.

The analytical system 100 may also include a number of external or internal devices such as input or output devices. For example, the analytical system 100 is shown with an input/output ("I/O") interface 708 that can receive input from input devices or provide output to output devices. A bus 706 can also be included in the analytical system 100. The bus 706 can communicatively couple one or more components of the analytical system 100. In some embodiments, the bus 706 is used to implement the operations described above with respect to FIG. 2 that involve communicating signals via a data bus.

The analytical system 100 executes program code that configures the processor 702 to perform one or more of the operations described above with respect to FIGS. 1-6. The program code includes, for example, the analytical engine 102 or other suitable applications that perform one or more operations described herein. The program code may be resident in the memory device 704 or any suitable computer-readable medium and may be executed by the processor 702 or any other suitable processor. In some embodiments, the program code described above is stored in the memory device 704, as depicted in FIG. 7. In additional or alternative embodiments, the program code described above is stored in one or more memory devices accessible via a data network.

The analytical system 100 can access the metrics dataset 103 in any suitable manner. In some embodiments, the metrics dataset 103 is stored in one or more memory devices accessible via a data network 114, as in the example depicted in FIG. 7. In additional or alternative embodiments, some or all of the metrics dataset 103 is stored in the memory device 704.

The analytical system 100 depicted in FIG. 7 also includes at least one network interface 710. The network interface 710 includes any device or group of devices suitable for establishing a wired or wireless data connection to one or more data networks 114. Non-limiting examples of the network interface 710 include an Ethernet network adapter, a modem, and/or the like. The analytical system 100 is able to communicate with one or more online services 112 using the network interface 710. In some embodiments, the network interface 710 is used to implement the operations described above with respect to FIG. 2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computing system for detecting anomalous metrics data representing activity over a data network, the computing system comprising:
   a non-transitory computer-readable medium storing a metrics dataset comprising data items whose metrics values indicate data network activity, wherein the metrics dataset includes segments, wherein each segment comprises a respective subset of the data items having a common feature with respect to computing devices or users of the computing devices involved in the data network activity;
   a processing device communicatively coupled to the non-transitory computer-readable medium and configured to access the metrics data set and to execute program code stored in the non-transitory computer-readable medium or another non-transitory computer-readable medium,
   wherein, when executed by the processing device, the program code configures the processing device to perform operations comprising:
   identifying anomalous segments in the metrics dataset based on each anomalous segment having a respective segment trend that is different from a trend for the metrics dataset,
   generating a data graph comprising nodes and edges, wherein each node represents a respective one of the anomalous segments and is connected to the other nodes of the data graph via a respective subset of the edges,
   applying respective weights to the edges, wherein each weight applied to a respective edge between a respective pair of nodes is computed from (i) a respective similarity between a respective pair of anomalous segments represented by the nodes and (ii) a respective relationship between the respective pair of anomalous segments and the metrics dataset, wherein the operations further comprise determining each relationship between the respective pair of anomalous segments by performing additional operations comprising:
   (a) computing a respective correlation score indicating a respective degree of correlation between the metrics dataset and at least one anomalous segment from the respective pair of anomalous segments,
   (b) computing a respective contribution score indicating a respective contribution of the at least one anomalous segment to the metrics values of the metrics dataset, and
   (c) determining the relationship from a respective combination of the respective correlation score and the respective contribution score,
   ranking the anomalous segments based on the weights applied to the edges, and
   selecting one of the anomalous segment having a rank that is greater than a threshold rank.

2. The computing system of claim 1, wherein identifying an anomalous segment comprises:
   computing a correlation score indicating a correlation between the anomalous segment and the metrics dataset; and
   selecting the anomalous segment based on the correlation score being below a threshold correlation score.

3. The computing system of claim 1, wherein each data item comprises a first attribute having a metrics data value and a second attribute indicating a feature of a computing device or a user of the computing device involved in the data network activity, wherein the common feature for a segment comprises each data item in the segment having a common value for the second attribute or a value within a common range of values for the second attribute.

4. The computing system of claim 3, wherein the second attribute comprises at least one of:
   a geographic attribute of the computing device or the user;
   a demographic attribute of the user;
   a hardware attribute of the computing device; or
   a software attribute of the computing device.

5. The computing system of claim 1, wherein the data graph is a directed graph and wherein ranking the anomalous segments comprises executing a PageRank algorithm with the nodes and the edges as inputs.

6. The computing system of claim 5, wherein ranking the anomalous segments comprises:
   determining a first ranking for a first node in the data graph;

identifying a first weight for an edge from the first node to a second node and a second weight for an edge from the first node to a third node;

computing a second ranking for the second node based on a portion of the first ranking, wherein the portion of the first ranking is determined based on the first weight; and computing a third ranking for the third node based on a different portion of the first ranking, wherein the different portion of the first ranking is determined based on the second weight.

7. A method comprising:

a step for accessing a metrics dataset comprising data items whose metrics values indicate data network activity, wherein the metrics dataset includes segments, wherein each segment comprises a respective subset of the data items having a common feature with respect to computing devices or users of the computing devices involved in the data network activity;

a step for identifying anomalous segments in the metrics dataset;

a step for generating a data graph comprising nodes and edges, wherein each node represents a respective one of the anomalous segments and is connected to the other nodes of the data graph via a respective subset of the edges;

a step for applying respective weights to the edges, wherein each weight applied to a respective edge between a respective pair of nodes is computed from (i) a respective similarity between a respective pair of anomalous segments represented by the nodes and (ii) a respective relationship between the respective pair of anomalous segments and the metrics dataset, wherein the method further comprises determining each relationship between the respective pair of anomalous segments by performing operations comprising:

(a) computing a respective correlation score indicating a respective degree of correlation between the metrics dataset and at least one anomalous segment from the respective pair of anomalous segments, (b) computing a respective contribution score indicating a respective contribution of the at least one anomalous segment to the metrics values of the metrics dataset, and (c) determining the relationship from a respective combination of the respective correlation score and the respective contribution score;

a step for ranking the anomalous segments based on the weights applied to the edges; and a step for selecting one of the anomalous segment having a rank that is greater than a threshold rank.

8. The method of claim 7, wherein identifying an anomalous segment comprises:

computing a correlation score indicating a correlation between the anomalous segment and the metrics dataset; and selecting the anomalous segment based on the correlation score being below a threshold correlation score.

9. The method of claim 7, wherein each data item comprises a first attribute having a metrics data value and a second attribute indicating a feature of a computing device or a user of the computing device involved in the data network activity, wherein the common feature for a segment comprises each data item in the segment having a common value for the second attribute or a value within a common range of values for the second attribute.

10. The method of claim 9, wherein the second attribute comprises at least one of:

a geographic attribute of the computing device or the user;

a demographic attribute of the user;

a hardware attribute of the computing device; or a software attribute of the computing device.

11. The method of claim 7, wherein the data graph is a directed graph and wherein the step for ranking the anomalous segments comprises executing a PageRank algorithm with the nodes and the edges as inputs.

12. The method of claim 11, wherein ranking the anomalous segments comprises:

determining a first ranking for a first node in the data graph;

identifying a first weight for an edge from the first node to a second node and a second weight for an edge from the first node to a third node;

computing a second ranking for the second node based on a portion of the first ranking, wherein the portion of the first ranking is determined based on the first weight; and computing a third ranking for the third node based on a different portion of the first ranking, wherein the different portion of the first ranking is determined based on the second weight.

13. A non-transitory computer-readable medium having program code executable by a processing device stored thereon, the program code comprising:

program code for accessing a metrics dataset comprising data items whose metrics values indicate data network activity, wherein the metrics dataset includes segments, wherein each segment comprises a respective subset of the data items having a common feature with respect to computing devices or users of the computing devices involved in the data network activity;

program code for identifying anomalous segments in the metrics dataset based on each anomalous segment having a respective segment trend that is different from a trend for the metrics dataset;

program code for generating a data graph comprising nodes and edges, wherein each node represents a respective one of the anomalous segments and is connected to the other nodes of the data graph via a respective subset of the edges;

program code for applying respective weights to the edges, wherein each weight applied to a respective edge between a respective pair of nodes is computed from (i) a respective similarity between a respective pair of anomalous segments represented by the nodes and (ii) a respective relationship between the respective pair of anomalous segments and the metrics dataset, wherein the program code further comprises program code for determining each relationship between the respective pair of anomalous segments by performing operations comprising:

(a) computing a respective correlation score indicating a respective degree of correlation between the metrics dataset and at least one anomalous segment from the respective pair of anomalous segments, (b) computing a respective contribution score indicating a respective contribution of the at least one anomalous segment to the metrics values of the metrics dataset, and (c) determining the relationship from a respective combination of the respective correlation score and the respective contribution score, program code for ranking the anomalous segments based on the weights applied to the edges; and program code for selecting one of the anomalous segment having a rank that is greater than a threshold rank.

14. The non-transitory computer-readable medium of claim 13, wherein identifying an anomalous segment comprises:

computing a correlation score indicating a correlation between the anomalous segment and the metrics dataset; and selecting the anomalous segment based on the correlation score being below a threshold correlation score.

15. The non-transitory computer-readable medium of claim 13, wherein each data item comprises a first attribute having a metrics data value and a second attribute indicating a feature of a computing device or a user of the computing device involved in the data network activity, wherein the common feature for a segment comprises each data item in the segment having a common value for the second attribute or a value within a common range of values for the second attribute.

16. The non-transitory computer-readable medium of claim 13, wherein the data graph is a directed graph and wherein ranking the anomalous segments comprises executing a PageRank algorithm with the nodes and the edges as inputs, wherein ranking the anomalous segments comprises:

determining a first ranking for a first node in the data graph;

identifying a first weight for an edge from the first node to a second node and a second weight for an edge from the first node to a third node;

computing a second ranking for the second node based on a portion of the first ranking, wherein the portion of the first ranking is determined based on the first weight; and computing a third ranking for the third node based on a different portion of the first ranking, wherein the different portion of the first ranking is determined based on the second weight.

17. The non-transitory computer-readable medium of claim 13, wherein the program code further comprises program code for computing each weight from (i) the respective similarity between the respective pair of anomalous segments represented by the nodes and (ii) the respective relationship between the respective pair of anomalous segments and the metrics dataset.

* * * * *